US009626076B2

(12) United States Patent
Lee et al.

(10) Patent No.: US 9,626,076 B2
(45) Date of Patent: Apr. 18, 2017

(54) DISPLAY APPARATUS FOR DISPLAYING IMAGES AND METHOD THEREOF

(71) Applicant: SAMSUNG ELECTRONICS CO., LTD., Suwon-si (KR)

(72) Inventors: Hye-won Lee, Seoul (KR); Yong-Ho Kim, Seoul (KR); Jong-woo Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 319 days.

(21) Appl. No.: 14/099,018

(22) Filed: Dec. 6, 2013

(65) Prior Publication Data
US 2014/0164931 A1 Jun. 12, 2014

(30) Foreign Application Priority Data
Dec. 6, 2012 (KR) .................. 10-2012-0141459

(51) Int. Cl.
*G06F 3/0482* (2013.01)
*G11B 27/031* (2006.01)
*G11B 27/10* (2006.01)
*G11B 27/34* (2006.01)

(52) U.S. Cl.
CPC .......... *G06F 3/0482* (2013.01); *G11B 27/031* (2013.01); *G11B 27/10* (2013.01); *G11B 27/34* (2013.01)

(58) Field of Classification Search
CPC ..... G06F 3/0482; G11B 27/031; G11B 27/10; G11B 27/34
See application file for complete search history.

(56) References Cited

U.S. PATENT DOCUMENTS

| 2005/0190280 A1* | 9/2005 | Haas ................ G06F 3/0485 348/333.05 |
| 2008/0155422 A1 | 6/2008 | Manico et al. |
| 2010/0064223 A1* | 3/2010 | Tilton ................ G06T 13/80 715/732 |
| 2010/0118037 A1* | 5/2010 | Sheikh ................ G06T 13/80 345/473 |
| 2010/0238176 A1* | 9/2010 | Guo ................ G06T 11/206 345/440 |

(Continued)

FOREIGN PATENT DOCUMENTS

| EP | 2 299 371 A1 | 3/2011 |
| JP | 2000-67057 A | 3/2000 |
| JP | 2005-354332 A | 12/2005 |

OTHER PUBLICATIONS

Communication, dated Apr. 2, 2014, issued by the European Patent Office in counterpart European Application No. 13195832.4.

*Primary Examiner* — David F Dunphy
(74) *Attorney, Agent, or Firm* — Sughrue Mion, PLLC

(57) ABSTRACT

A display apparatus is disclosed. The display apparatus includes a storage configured to store a plurality of images, a controller configured to select a plurality of related images having a common element from the plurality of images, and a display configured to sequentially display the plurality of related images while executing an image transition between each of the sequentially displayed related images through intermediation of the common element of the plurality of related images, whereby the related images can be provided to a user in a continuous manner.

24 Claims, 16 Drawing Sheets

(56) References Cited

U.S. PATENT DOCUMENTS

2012/0154684 A1* 6/2012 Luo ..................... G11B 27/034
  348/700
2013/0124951 A1* 5/2013 Shechtman ............. G06T 13/80
  715/201

* cited by examiner

FIG. 13A
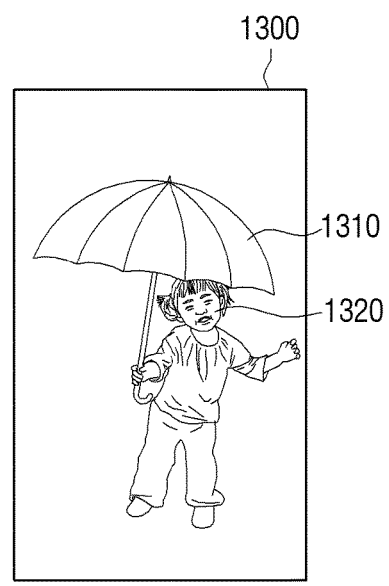
FIG. 13B
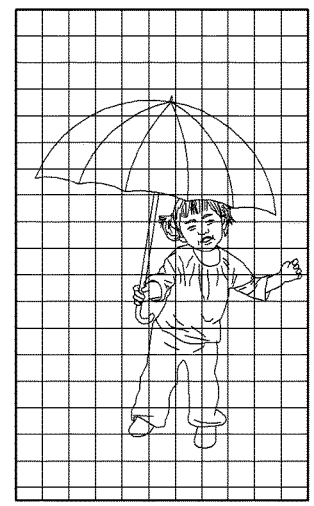
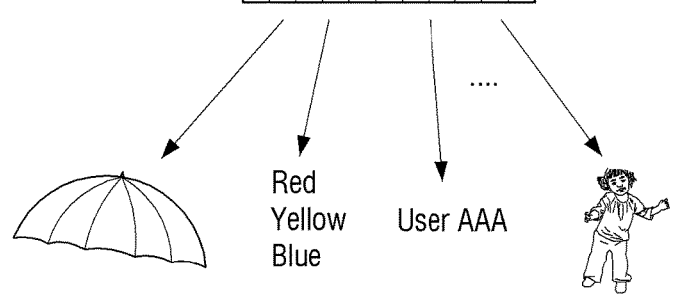

DISPLAY APPARATUS FOR DISPLAYING IMAGES AND METHOD THEREOF

CROSS-REFERENCE TO RELATED APPLICATIONS

This application claims priority from Korean Patent Application No. 10-2012-0141459, filed on Dec. 6, 2012, in the Korean Intellectual Property Office, the disclosure of which is incorporated herein by reference in its entirety.

BACKGROUND

1. Field

Apparatuses and methods consistent with exemplary embodiments relate to providing a display apparatus and an image displaying method thereof, and more particularly, to providing a display apparatus, capable of displaying related images of a plurality of images in a manner such as a slide show, and an image displaying method thereof.

2. Description of the Related Art

With development of electronic technologies, various types of display apparatuses (or display devices) are being invented and used. Especially, display apparatuses, such as smart phones, personal computers (PCs), personal digital assistants (PDAs), digital cameras, laptop computers, and the like, are widely used.

Most of the portable devices which are recently used have a capturing element and a display element. This may allow a user to view a captured image through a display screen.

In general, captured images may be stored in a sequence based on their respective a capture times. Therefore, when a user desires to view images, the stored images may be displayed in sequence based on their respective capture times.

However, in the related art, even if the user wants to view only certain desired images, the user has to check all of the stored images. Especially, when a slide show function of automatically displaying a plurality of images in a sequential manner is executed, all of the plurality of images is displayed one by one by a predetermined time interval. Therefore, the user must continuously monitor the slide show to determine whether his desired images are displayed.

SUMMARY

Exemplary embodiments address the above problems and/or disadvantages and other disadvantages not described above. Also, exemplary embodiments are not required to overcome the disadvantages described above, and an exemplary embodiment may not overcome any of the problems described above.

One or more exemplary embodiments provide a display apparatus, in which related images are selected using characteristic information related to a plurality of images and displaying the selected related images in a sequential manner, and an image displaying method thereof.

According to an aspect of an exemplary embodiment, there is provided a display apparatus including: a storage configured to store a plurality of images; a controller configured to select a plurality of related images having a common element from the plurality of images; and a display configured to sequentially display the plurality of related images while executing an image transition between each of the sequentially displayed related images through intermediation of the common element of the plurality of related images.

The controller may be further configured to control the display to output one image by selecting the one image from the plurality of images in response to a slide show display command being input, and control the display to output each selected related image in a sequential manner by repetitively performing an operation of selecting one succeeding image from the plurality of images as the related image for the selected one image, the one succeeding image having a common element to an element included in the selected one image.

The display apparatus may further include an image sensor configured to capture an image. The controller may be further configured to detect characteristic information related to the captured image in response to the image sensor capturing the image, store the detected characteristic information and the captured image in the storage, and select the captured image as a related image of the plurality of related images by comparison of the characteristic information.

The storage may be further configured to store a plurality of transition platforms. The controller may be further configured to generate a transition screen, corresponding the image transition between each of the sequentially displayed related images, by using a transition platform, corresponding to the common element among the related images, of the plurality of transition platforms.

The common element may be divided into a plurality of element items having preset priorities. The controller may be further configured to select the related images by sequentially comparing the plurality of element items according to the priorities.

The controller may be configured to sequentially select the related images having the common element by comparing the plurality of images in a time sequence in response to a sequential arrangement command being input.

The controller may be configured to select the related images among the plurality of images in a sequence of decreasing relevance beginning with the related image having a most similar common element of the related images in response to a non-sequential arrangement command being input.

The common element may include at least one element item of an average color of the image, a color of an object included in the image, an object shape, an object type, an object display position, an image composition, a symbol, a natural element, and a person.

The display may be further configured to display a select screen for selecting an element item which serves as a determination reference of the common element. The controller may be further configured to select the related images by comparing the element items selected through the select screen.

According to an aspect of another exemplary embodiment, there is provided an image displaying method including: selecting a plurality of related images having a common element from a plurality of stored images; and sequentially displaying the plurality of related images with executing an image transition between each of the sequentially displayed related images through intermediation of the common element of the plurality of related images.

The selecting the plurality of images may include: selecting one image from the plurality of images in response to a slide show display command being input; and selecting at least one related image by repetitively executing an operation of selecting one succeeding image from the plurality of images as a related image for the selected image, the one succeeding image having a common element to an element included in the selected image. The sequentially displaying the plurality of related images may be executed to sequentially display the at least one related image after displaying the selected image.

The image displaying method may further include acquiring a captured image by executing a capturing operation, detecting characteristic information related to the captured image, and matching the detected characteristic information with the captured image for storage.

The image displaying method may further include generating a transition screen, corresponding to the image transition between each of the sequentially displayed related images by using a transition platform, corresponding to the common element between the related images, of a plurality of stored transition platforms.

The common element may be divided into a plurality of element items having preset priorities. The selecting the plurality of related images may be executed to select the related image by sequentially comparing the plurality of element items according to the priorities.

The selecting the plurality of related images may be executed to sequentially select the related images having the common element by comparing the plurality of images in a time sequence in response to a sequential arrangement command being input.

The selecting the plurality of related images may be executed to select the related images from the plurality of images in a sequence of decreasing relevance beginning with the related image having a most similar common element of the related images, in response to a non-sequential arrangement command being input.

The common element may include at least one element item of an average color of the image, a color of an object included in the image, an object shape, an object type, an object display position, an image composition, a symbol, a natural element, and a person.

The image displaying method may further include displaying a select screen for selecting an element item which serves as a determination reference of the common element. The selecting the plurality of related images may be executed to select the related image by comparing the element items selected through the select screen.

According to an aspect of another exemplary embodiment, there is provided a display apparatus including: a storage configured to store a plurality of images; a controller configured to select related images having a common element from the plurality of images; and a display configured to sequentially display the related images.

The controller may be further configured to control the display to display at least one transition image between each of the sequentially displayed related images.

The controller may be further configured to generate each of the at least one transition image based on the common element of adjacent related images of the sequentially displayed related images and a stored transition platform corresponding to the common element of the adjacent related images.

The common element may be selected from at least one element included in a first image from the plurality of images. The first image may be selected in response to a first input by a user.

The common element may be automatically selected from the at least one element included in the first image based on preset priorities.

The common element may be selected from the at least one element included in the first image in response to a second input by the user.

The common element may include at least one element item of an average color of the image, a color of an object included in the image, an object shape, an object type, an object display position, an image composition, a symbol, a natural element, and a person.

The related images may be arranged to be sequentially displayed based on an order that the related images are stored in.

The related images may be arranged to be sequentially displayed based on a relevance of the common element of each of the related images to the common element of the first image.

In accordance with various exemplary embodiments, a display apparatus may relevantly display related images among a plurality of images, thereby improving user's convenience and satisfaction.

BRIEF DESCRIPTION OF THE DRAWINGS

The above and/or other aspects will be more apparent by describing certain exemplary embodiments with reference to the accompanying drawings, in which:

FIGS. 13A and 13B are views illustrating a method of extracting element information by analyzing a captured image;

DETAILED DESCRIPTION OF EXEMPLARY EMBODIMENTS

Figure 1:
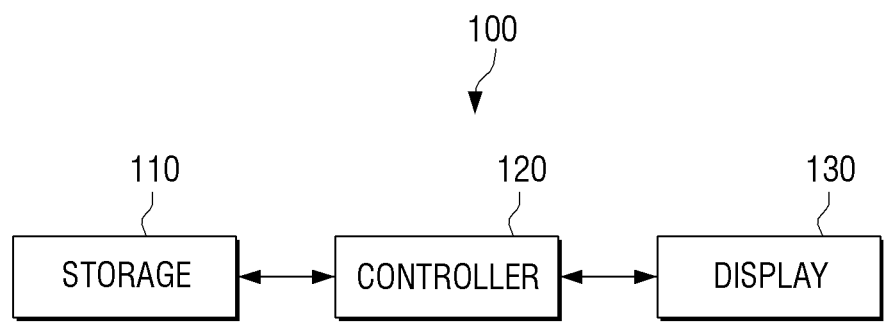
FIG. 1 is a block diagram illustrating a configuration of a display apparatus in accordance with an exemplary embodiment.

Hereinafter, certain exemplary embodiments are described in greater detail with reference to the accompanying drawings.

In the following description, like drawing reference numerals are used for the same elements, even in different drawings. The following description and the accompanying drawings are provided for better understating of exemplary embodiments and well-known functions or constructions are not described in detail since they would obscure exemplary embodiments with unnecessary detail.

FIG. 1 is a block diagram illustrating a configuration of a display apparatus in accordance with an exemplary embodiment. The display apparatus 100 may be implemented as, but is not limited to, various types of apparatuses having a display means, such as a camera, a mobile phone, a PDA, a tablet PC, a laptop PC, a PC, a TV, an MP3 player, a kiosk, an electronic frame, an e-book, and the like.

As illustrated in FIG. 1, the display apparatus 100 may include a storage 110, a controller 120, and a display 130.

The storage 110 may store a plurality of images. When the display apparatus 100 includes a capturing element, the storage unit 110 may store a captured image in the display apparatus 100. Also, when the display apparatus 100 includes an interface for connection with an external server or storage medium, the storage 110 may store an image transferred from the external server or storage medium. The storage 110 may be implemented as various storage media, such as a flash memory or hard disk drive (HDD).

The controller 120 may select a plurality of related images having a common element from a plurality of images stored in the storage 110. The common element indicates that elements such as characteristics of objects like a figure (e.g., a person, user), a thing, a background and the like within an image, or an overall characteristic of the image are present within a preset error range. For instance, when a plurality of images commonly have at least one element item of an average color of the image, a color of an object included in the image, an object shape, an object type, an object display position, an image composition, a symbolic icon (or a symbol), a natural element, and a person, the element item is referred to as a common element.

Determination as to whether a common element is present may be implemented by various algorithms. As one example, the controller 120 may analyze each image to detect an edge portion included in the images. The controller 120 may check a pixel value of each image, and detect a pixel point, at which a difference between the checked pixel value and neighboring pixel values is more than a preset threshold value, as an edge portion. Once the edge portion is detected, the controller 120 may group the neighboring pixels, which are divided based on the edge portion, according to the pixel values. The controller 120 may then recognize each of the pixel groups as one object. When objects are recognized in a plurality of images, the controller 120 may determine a color, a shape, a display position and the like of the objects based on the number, positions, pixel values or the like of pixels configuring each object. The object shape refers to an appearance characteristic of the object, such as a square shape, a circular shape, a pentagonal shape, or a cylindrical shape. Also, the display position refers to a point where the object is displayed.

The controller 120 may determine a type of a corresponding object by comparison with reference information stored in the storage 110. The object type refers to whether the corresponding object is a thing, a person, an animal, or a plant. That is, since images are mostly captured around living environments of persons, the images may include things, such as buildings, cars, traffic lights, roads, natural elements and the like, people, animals, plants and the like. The natural element may refer to a mountain, the sky, a river, the sea and the like.

Therefore, images of those objects may be captured in advance under various exposure conditions. The captured images may be analyzed, respectively, to detect characteristic information such as a shape or color of each object within the images. When a plurality of images are present, characteristic information within a predetermined range may be decided, taking into account even a distribution of the characteristic information. Persons, such as a manufacturer of the display apparatus 100, a contents manufacturer, a software developer and the like, may match the characteristic information with types of corresponding objects in advance to store as reference information in the storage 110. Therefore, when characteristic information corresponding to the reference information stored in the storage 110 is checked, it may be determined that the image includes an object matching the corresponding characteristic information.

Meanwhile, symbolic things (symbols, symbolic icons) may also exist in famous cities or zones. For example, things such as the Eifel Tower in Paris, the Greek pyramid and the like may have symbolism which directly gives an impression of the zones where the corresponding things exist. Therefore, information related to the symbolic icons may also be stored in the storage 110 in advance. The controller 120 may sort all the images which include an object determined as the symbolic icon as a related image.

According to an exemplary embodiment, a plurality of element items which may be applied as the common element may be provided with preset priorities. The priorities may be set as defaults by the manufacturer of the display apparatus 100 or other third parties and stored in the form of initialization data in the storage 110. The priorities may also be randomly set by a user to be stored in the storage 110.

When the priorities are set, the controller 120 may sequentially compare a plurality of element items according to the priorities, and select a related image. For example, when priorities are set in the order of: a person>an object type>an object shape>an object color>an object display position>an image composition, the controller 120 may select images, which include the same person as a person included in the current image, as related images. After selecting all of the images including the same person, the controller 120 may select images, which include the same type of object as an object included in the current image, as related images. Afterwards, the controller 120 may select the related images, in a sequence of an image including an object with the same color, an image in which an object located on the same position is displayed, an image having similar composition of objects, and the like.

In accordance with another exemplary embodiment, a user may directly select an element item for determining the common element. In this case, the display 130 may display a select window for selecting the element item. The select screen may display various element items, such as an object type, an object shape, an object color, an object display position, an image composition, a person, a symbolic icon, an overall image color and the like. The user may select at least one of the element items. The controller 120 may compare only the selected element item to select a related image. For example, when the user selects only the object shape, even if other images with the same person and the same color are present, the other images may not be selected as the related image. Only images which include an object in the same shape as an object included in a reference image may be selected as the related image.

The display 130 may sequentially display a plurality of related images selected in the controller 120. Here, the display 130 may display each related image in a manner of displaying at least one image on a screen, and transiting to at least one succeeding image when a preset time elapses. Upon the image transition, the common element of the related images may be used as intermediation. The transition through the intermediation of the common element may be implemented in various manners according to a type of common element. A detailed transition operation will be explained later.

When the related images are sequentially transiting, the user may semantically view the plurality of related images in a continuous manner. Specifically, when various transition effects are provided through intermediation of a common element among images, a user may view related images like watching a video, such as a movie or drama. Also, if necessary, the user may easily extract and store photos captured in relation to a predetermined event, such as childbirth, travel, wedding, birthday and the like, by selecting a common element. Therefore, images stored in the storage 110 may be conveniently sorted for each related image, or an edit operation for the stored images, such as copying, shifting, deleting and the like, may be executed, or such images may be stored in a separate file.

Figure 2:
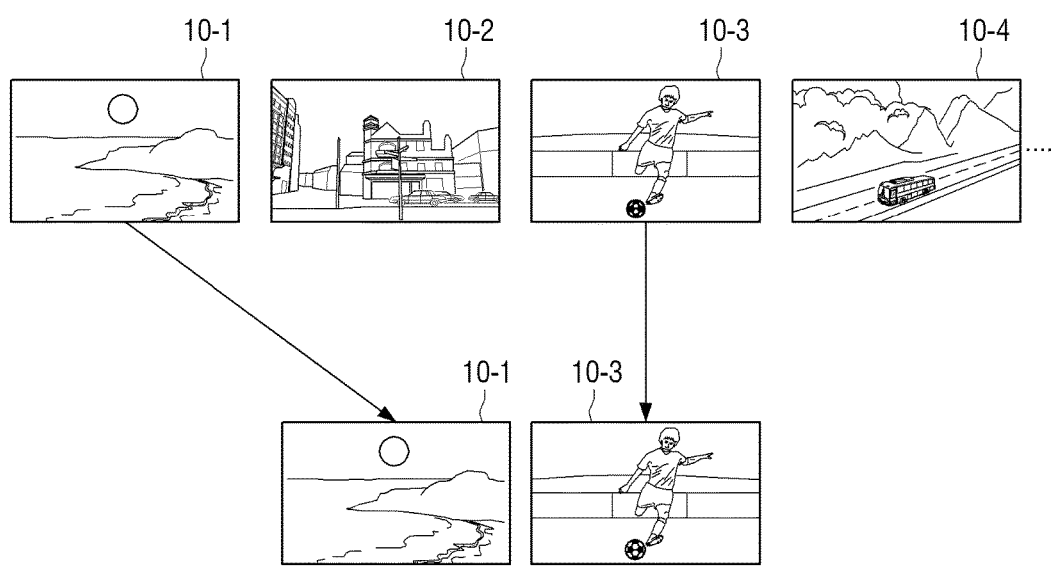
FIG. 2 is a view illustrating a method of selecting a related image based on an object shape.

FIG. 2 is a view illustrating a method of selecting a related image from a plurality of images by using an object shape as a common element. As illustrated in FIG. 2, the storage 110 may store a plurality of images 10-1, 10-2, 10-3, and 10-4. For the sake of explanation, only four images are illustrated, but more images may also be stored depending on a capacity of the storage 110. The images 10-1, 10-2, 10-3, and 10-4 may be arranged according to various standards, such as a captured time-based sequence, a storage sequence, a reception sequence and the like. In FIG. 2, the first image 10-1 refers to the most recently stored image, and the fourth image 10-4 refers to the most early stored image of the four images.

As illustrated in FIG. 2, objects included in the images 10-1, 10-2, 10-3 and 10-4 may have various shapes according to characteristics of objects captured. For instance, when the sun, such as in the first image 10-1, is captured, the controller 120 may recognize the sun as a circular object. Also, when a scene of playing soccer, such as in the third image 10-3, is captured, the controller 120 may recognize the soccer ball as a circular object. The controller 120 may determine that such a circular object is not included in the second and fourth images 10-2 and 10-4. The object recognition algorithm has been already described in detail, so repetitive description will be omitted.

Accordingly, the controller 120 may determine that the first and third images 10-1 and 10-3 have the circular object as a common element, and thus select the first and third images 10-1 and 10-3 as related images.

Although a sun is shown in the first image 10-1 of FIG. 2, the images 10-1, 10-2, 10-3, and 10-4 are merely exemplary. For example, instead of a sun being illustrated in the first image 10-1, a different scene of playing soccer could be illustrated in the first image 10-1 (not illustrated). In this case, the controller 120 may recognize a soccer ball in the first image 10-1 and in the third image 10-3 as a circular object. Accordingly, in this case the controller may select the first and third images 10-1 and 10-3 as related images which both illustrate scenes of playing soccer.

Figure 3:
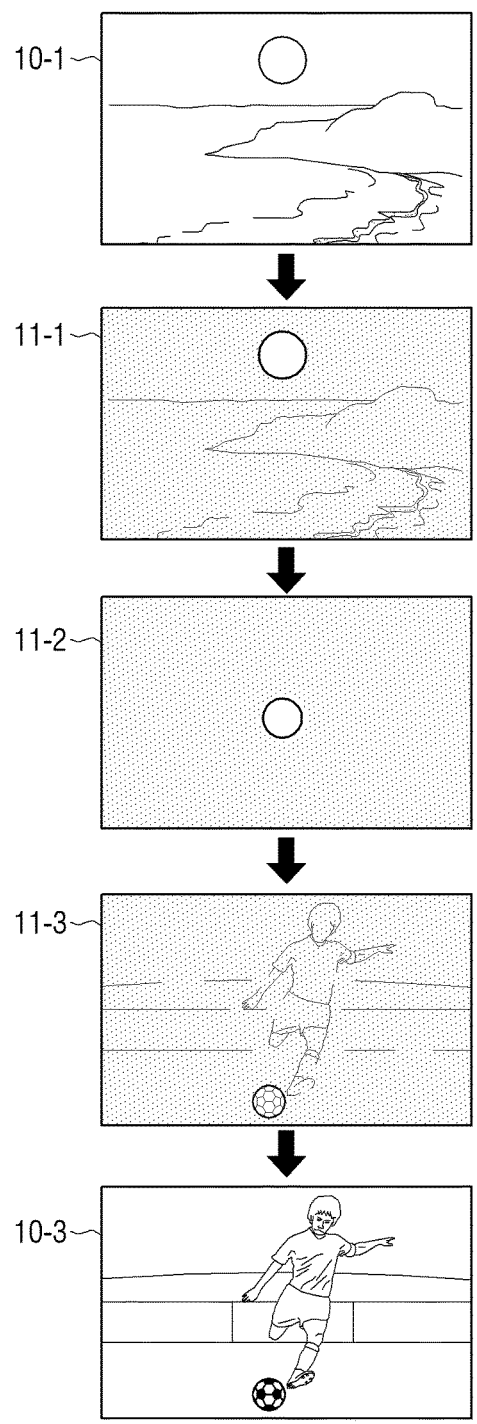
FIG. 3 is a view illustrating an image transition method through intermediation of an object shape.

FIG. 3 illustrates an image transition method between the selected first and third images 10-1 and 10-3 as illustrated in FIG. 2. Referring to FIG. 3, the controller 120 may first display the first image 10-1. The controller 120 may then generate transition screens 11-1, 11-2, and 11-3. FIG. 3 illustrates the three transition screens 11-1, 11-2, and 11-3, but the number of transition screen may also be one or two or more than three.

As illustrated in FIG. 3, when objects with similar shapes are existing as the common element on the first and third images 10-1 and 10-3, the transition screens may be generated in form of graphic screens for representing fade-in and fade-out effects. That is, referring to FIG. 3, the controller 120 may first display the first image 10-1 and then render the first transition screen 11-1 after a preset time elapses. The first transition screen 11-1 may be a screen on which the other portion of the first image 10-1 except for the circular object gradually fades out based on the circular object. The controller 120 may then render the second transition screen 11-2 and the third transition screen 11-3 to be continuous to the first transition screen 11-1. The portion of the first image 10-1 other than the circular object may be displayed with gradually fading out through the second transition screen 11-2 and the third transition screen 11-3. As the first image 10-1, which has completely faded out except for the circular object, the shape of the third image 10-3 may fade in. Afterwards, the third image 10-3 may be fully displayed.

FIG. 3 illustrates a transition screen for providing a transition effect in a screen unit, but the transition effect may also be achieved in a line unit or a block or tile unit.

When positions of the circular objects, the common element, within the first image 10-1 and the third image 10-3 do not match each other, the controller 120 may gradually move the circular object of the first image 10-1 to the corresponding position within the third image 10-3 so as to be displayed thereon during the transition process. In detail, the controller 120 may gradually change a coordinate value of a pixel corresponding to the circular object within the transition screen. Also, an inner shape of the circular object within the first image 10-1 and an inner shape of the circular object within the third image 10-3 may be different from each other. Therefore, the controller 120 may change the positions of the two circular objects by overlapping them during the transition process.

Figure 4:
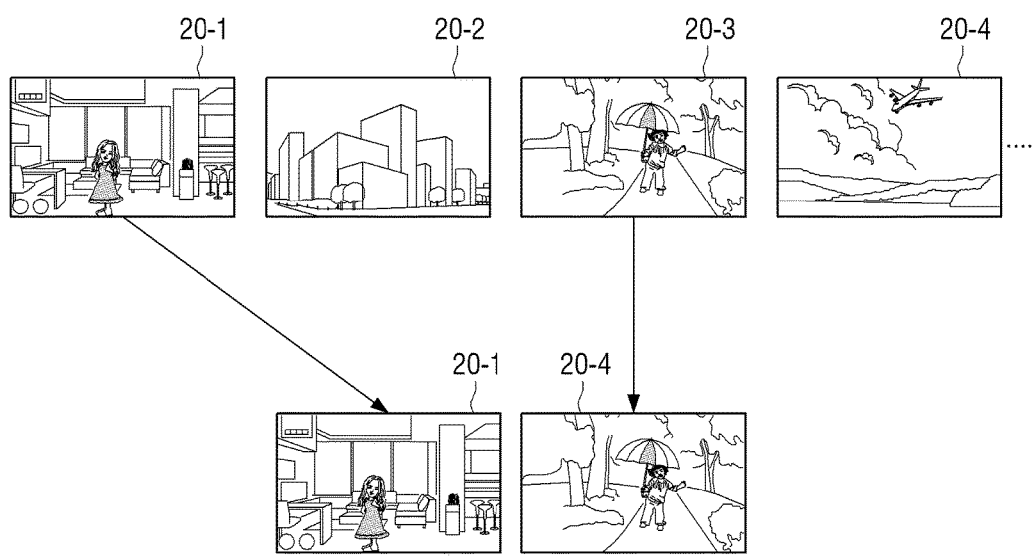
FIG. 4 is a view illustrating a method of selecting a related image based on an object color.

FIG. 4 is a view illustrating a method of selecting a related image based on a color of an object as a common element. As illustrated in FIG. 4, among four images 20-1, 20-2. 20-3, and 20-4, a person wearing clothes of a predetermined color is present in the first image 20-1, an object having the corresponding color is not present in the second and third images 20-2 and 20-3, and a person holding an umbrella of the same color as the predetermined color is present in the fourth image 20-4.

The controller 120 may recognize the aforementioned objects and determine colors of the objects according to pixel values. When the first image 20-1 is an image which has been the most recently captured or stored, the first image 20-1 may be set as a reference. That is, the controller 120 may select the fourth image 20-4 including the object, which has the same color as the color of the object included in the first image 20-1, as a related image with respect to the first image 20-1.

Figure 5:
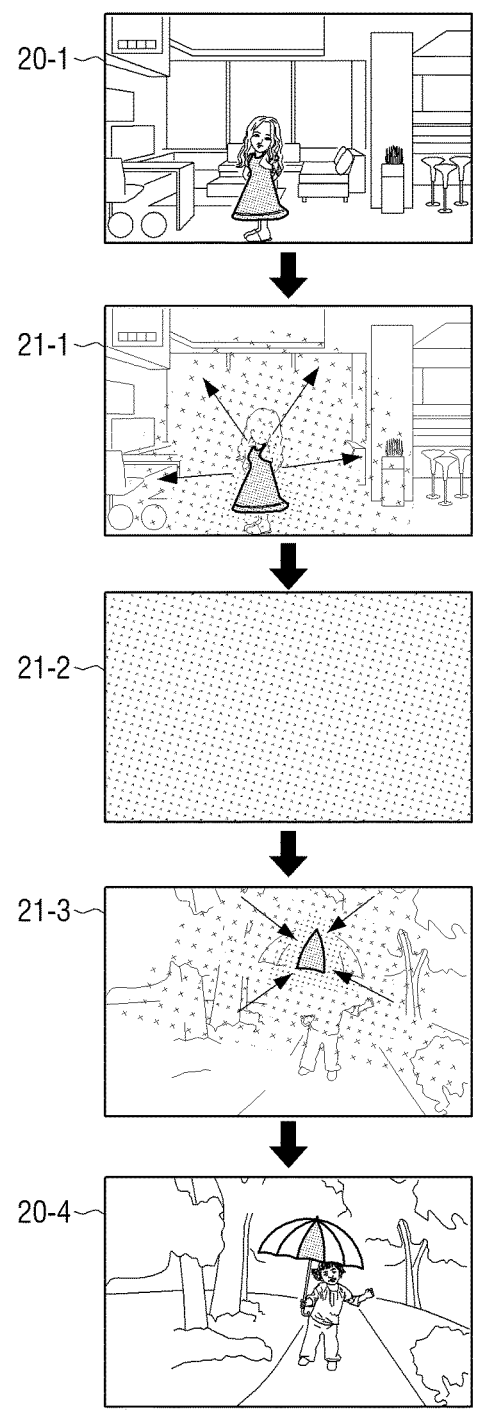
FIG. 5 is a view illustrating an image transition method through intermediation of an object color.

FIG. 5 is a view illustrating an image transition process between the selected related images illustrated in FIG. 4. As illustrated in FIG. 5, transition screens 21-1, 21-2, and 21-3 may be rendered between the first image 20-1 and the fourth image 20-4. As aforementioned, the number of the transition screens and the displaying method thereof may be varied.

The first to third transition screens 21-1, 21-2, and 21-3 may represent zoom-in and zoom-out effects based on the common element. That is, based on the clothes of the predetermined color within the first image 20-1, the controller 120 may control the clothes to be gradually enlarged such that the entire screen can be fully filled with the corresponding color as illustrated in the second transition screen 21-2. Afterwards, the controller 120 may execute zoom-out, as illustrated in the third transition screen 21-3, such that the color displayed region can be gradually reduced into the shape with the same color within the fourth image 20-4, thereby fully displaying the fourth image 20-4 on the entire screen.

FIGS. 3 and 5 have illustrated the image transition methods using the fade-in/fade-out effect and the zoom-in/zoom-out effect, but additionally, a viewing angle variation, a ghost effect and the like may also be applied to the image transition process.

Figure 6:
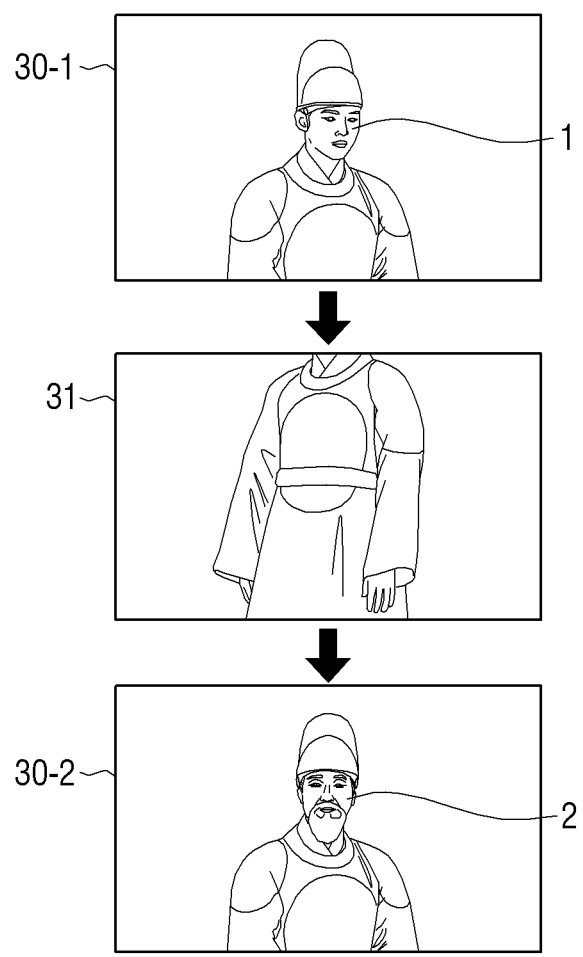
FIGS. 6 and 7 are views illustrating various methods of transiting an image through intermediation of a common element.

FIG. 6 is a view illustrating an image transition method using the viewing angle variation. FIG. 6 illustrates that a first image 30-1 and a second image 30-2 are selected as related images from images stored in the storage 110. The first image 30-1 and the second image 30-2 may include a person wearing the same clothes. However, the first image 30-1 was captured several years ago, and the second image 30-2 was captured recently.

Therefore, the first image 30-1 and the second image 30-2 may have both an object shape and an object color as the common element. However, a face or other parts of a body might have aged due to the lapse of time.

In this case, the controller may display a transition screen 31, on which a viewing angle is varied, between the first image 30-1 and the second image 30-2. That is, after displaying the first image 30-1 which has been captured with a camera angle facing an object, at least one transition screen 31, on which the camera angle is changed to a different direction, for example, to face a bottom surface, the sky, the horizon, a distant mountain, or a nearby building, may be displayed, followed by the second image 30-2. Here, the user may naturally recognize that the object captured has grown old due to the lapse of time.

Figure 7:
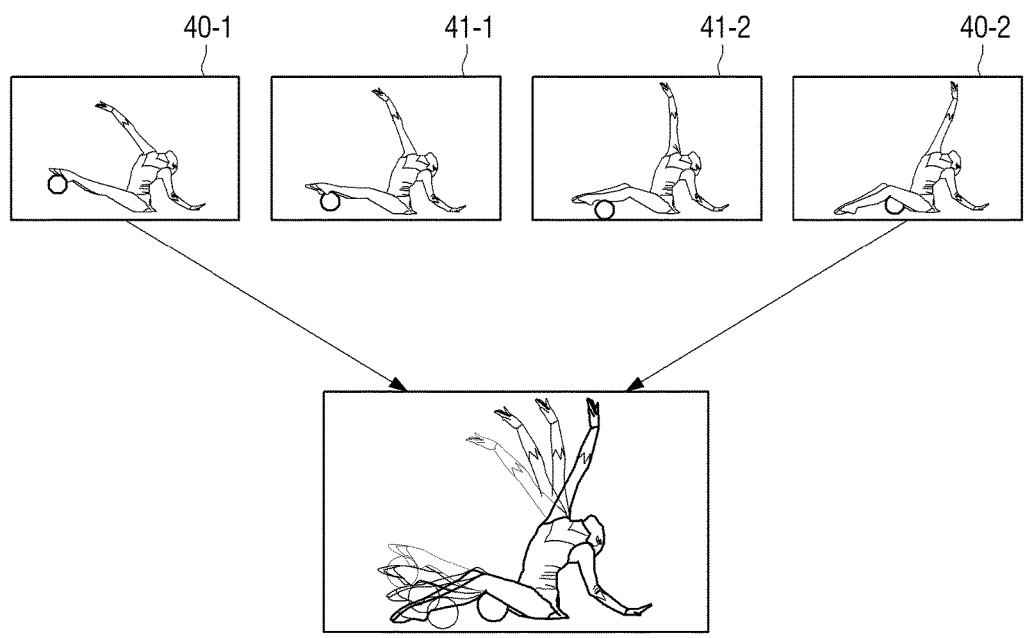

FIG. 7 illustrates an image transition method by giving a ghost effect. As illustrated in FIG. 7, when there are a plurality of images 40-1 and 40-2 which have been obtained by capturing a moving object under a similar surrounding environment, the controller 120 may render transition screens 41-1 and 41-2 for representing intermediate motions between motions of the object included in the respective images 40-1 and 40-2. Accordingly, ghost images may be displayed while the first image 40-1 is transiting to the second image 40-2.

In addition, when related images include a symbolic icon as a landmark, such as a tower or bridge, the image transition may be carried out through intermediation of the symbolic icon. Also, the image transition may be carried out through intermediation of things found in daily lives, such as a chair or a clock. For an image of a person, the image transition may be carried out through intermediation of a part of the image, such as the person's eye or smile. During the transition process, various aforementioned transition methods may be used.

The storage 110 may store a plurality of platforms for generating transition screens, software for executing transition, and the like. The controller 120 may generate transition screens between related images using a transition platform corresponding to a common element between the related images among the plurality of transition platforms stored.

The aforementioned operations of the controller 120 may be selectively carried out according to a user command.

Figure 8:
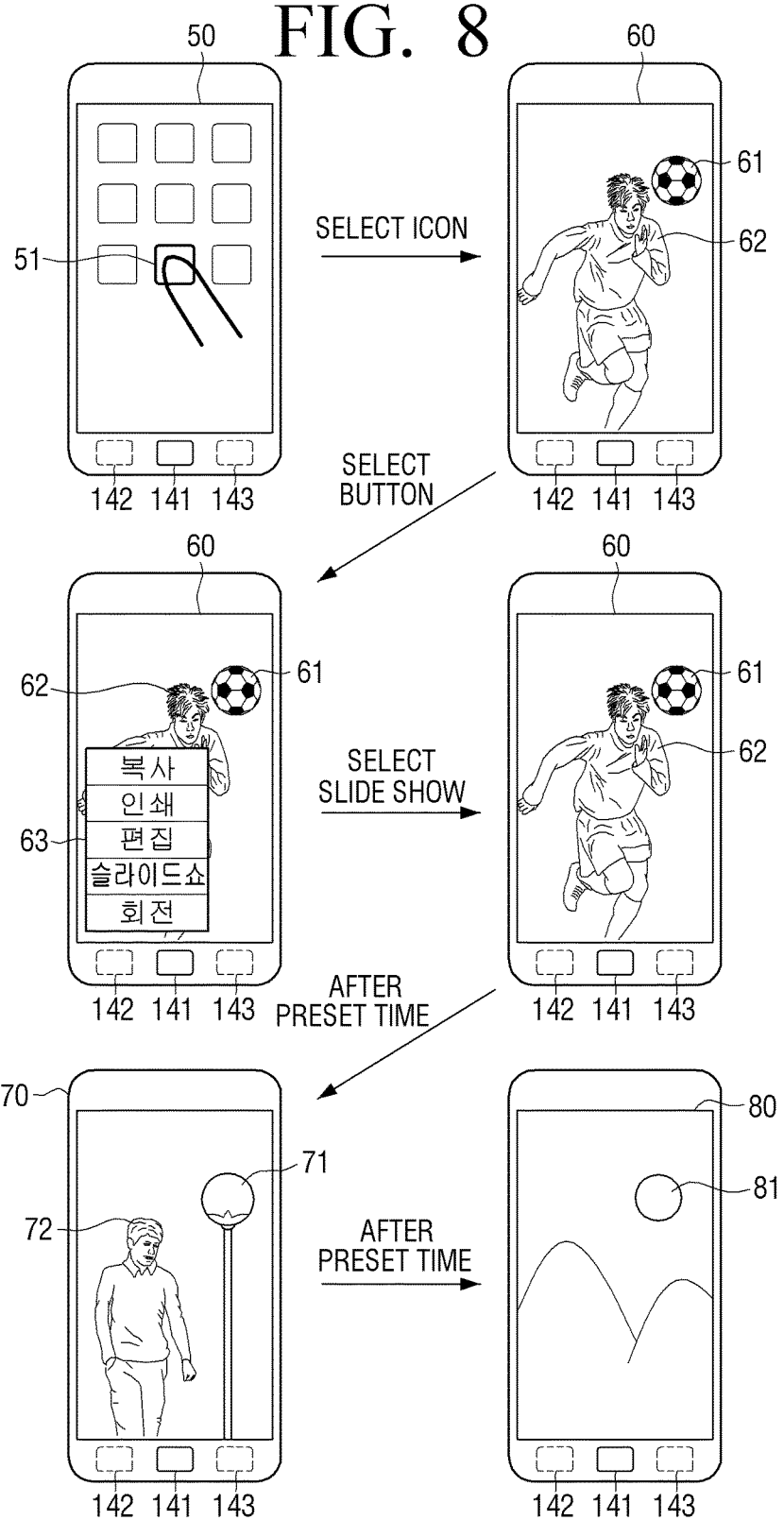
FIG. 8 is a view illustrating a process of executing a slide show.

FIG. 8 is a view illustrating a process of displaying related images according to a user selection. As illustrated in FIG. 8, the display apparatus 100 may display a wallpaper 50 on which various types of icons are displayed. The wallpaper 50 may be a home screen which is displayed as a default when the display apparatus 100 is in an unlock state, or a display screen on which icons or a list of applications or folders installed in the display apparatus 100 are displayed. FIG. 8 illustrates a state in which a plurality of icons are displayed on the wallpaper 50.

A user may select an icon 51 corresponding to an application for executing a gallery function among the icons displayed on the wallpaper 50. Here, the controller 120 may display one (for example, 60) of images stored in the storage 110. The first displayed image 60 may be the most recently stored image or the last displayed image upon a previous execution of the gallery function. FIG. 8 illustrates that the image 60 is immediately displayed when the icon selection is completed, but a select screen for a type of storage medium, a folder or the like provided in the display apparatus 100 may first be displayed prior to displaying the image 60. Similarly, thumbnail images of pre-stored images may first displayed and among them, a thumbnail selected by a user may be enlarged to a full size of a screen to be displayed like the image 60 of FIG. 8.

Referring to FIG. 8, various buttons 141, 142, and 143 may be provided on a main body of the display apparatus 100. FIG. 8 illustrates that a home button 141 is disposed on a lower end of a screen, and hidden buttons 142 and 143 are disposed on both sides of the home button 141. The home button 141 may be implemented in a form of a push button, and the hidden buttons 142 ad 143 may be implemented in a form of touch-sensitive buttons. The hidden buttons 142 and 143 may not be visible in a normal state. However, when a backlight is turned on in response to a touch input, the hidden buttons 142 and 143 may be visibly displayed. The configuration of the buttons of FIG. 8 is merely illustrative. The type, shape, position, and number of the buttons may be implemented in various manners. Also, the screen illustrated in FIG. 8 is configured such that the display 130 of the display apparatus 100 has a vertical length longer than a horizontal length. However, the display apparatus 100 may also be implemented as a device with a longer horizontal length, such as a table PC, a laptop computer, a PC monitor, a TV and the like.

When the user selects one of the hidden buttons 142 and 143 after the image 60 is displayed, the controller 120 may display a selection area 63 for menu selection. Various menus applicable to the currently displayed image 60 may be displayed on the selection area 63. A slide show may also be included as one of the menus. The slide show refers to a function of displaying a plurality of images by automatically shifting (transiting) plural images after a preset time interval even without a user manipulation. When the slide show menu is selected, the controller 120 may determine that a slide show display command has been input.

When the slide show display command is determined to have been input, the controller 120 may select and display one image 60 from the plurality of images, and select one succeeding image, which includes a common element to an element included in the selected image 60, as a related image with respect to the selected image 60. After a preset time (e.g., one second), the image 60 may transit into the selected related image. The controller 120 may repetitively execute the operation of selecting and displaying the related images until all the related images are displayed or a user stop command is input. This may allow the user to view the related images in a convenient manner.

When the current image 60 includes objects such as a circular object 61 and a person 62, as illustrated in FIG. 8, the controller 120 may select an image including a circular object or the same person as a related image. Alternatively, when a color is operating as a common element, the controller 120 may select as a related image, an image which includes the same color based on the color of the circular object 61, a skin tone of the person 62, a color of clothes that the person 62 is wearing, a background color and the like.

FIG. 8 illustrates related images 70 and 80 that have been selected using the circular object 61 as the common element. When a preset time (e.g., one second) elapses after the slide show display command is input, the currently displayed first image 60 may transit into the second image 70 through intermediation of the circular object 61 within the first image 60. The second image 70 may include a circular object 71 and a person 72.

The image transition may be carried out as illustrated with reference to FIG. 3 or FIG. 5. For example, when the method of FIG. 3 is applied, the controller 120 may display the second image 70 with fading in or fading out a screen based on the circular object 61 within the first image 60 and the circular object 71 within the second image 70. When the preset time elapses, the controller 120 may transit into the third image 80 including the another circular object 81. As described, a plurality of related images may be sequentially displayed according to the slide show display command.

Figure 9:
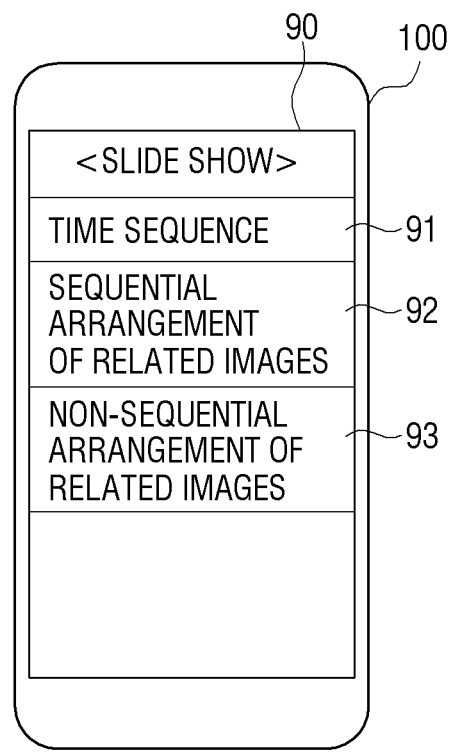
FIG. 9 is a view illustrating a select screen for selecting a slide show menu.

In accordance with another exemplary embodiment, a user may randomly set options of a slide show including whether or not to select a related image, a selection sequence, and the like. FIG. 9 illustrates an example of a select screen 90 for selecting options of a slide show.

As illustrated in FIG. 9, when the slide show menu is selected, a select screen 90 may be displayed. The select screen 90 may include a first menu 91 for executing a general slide show function of sequentially displaying all the images according to a storage sequence, a second menu 92 for executing a sequential arrangement function of selecting and arranging related images in a time sequence, and a third menu 93 for executing a non-sequential arrangement function of selecting and arranging related images based on relevance.

When the user selects the first menu 91, the controller 120 may execute the general slide show function. On the other hand, when the second or third menu 92 or 93 is selected, related images may be selected and displayed in a sequential manner.

Figure 10:
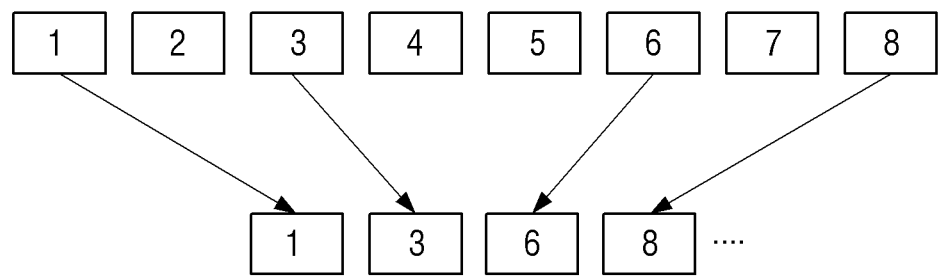
FIG. 10 is a view illustrating a method of selecting a related image according to a sequential arrangement command.

FIG. 10 is a view illustrating an image selecting method when a sequential arrangement menu is selected. For the sake of explanation, each image may be displayed with an identification mark (number) other than a real image.

As illustrated in FIG. 10, when a sequential arrangement command is input in a state of first to eighth images being stored, the controller 120 may sequentially compare the plurality of images in a time sequence. That is, when the first image is currently displayed, the controller 120 may determine whether or not the second image following the first image has a common element to the first image. When it is determined that a common element is not present, the controller 120 may compare the first image with the third image. FIG. 10 illustrates that the third image has been selected as a related image to the first image. When the third image is selected, the controller 120 may sequentially compare the succeeding images based on the third image. Accordingly, the sixth and eighth images may be sequentially selected. Referring to FIG. 10, the related images may be arranged and displayed in a sequence of $1^{st}$, $3^{rd}$, $6^{th}$, and $8^{th}$ images based on the storage sequence.

Figure 11:
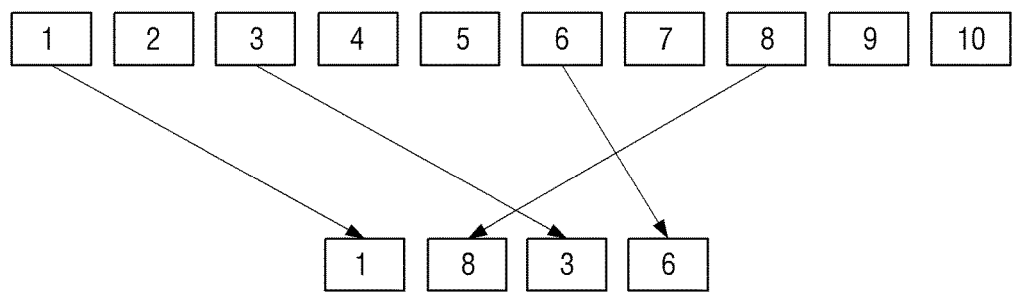
FIG. 11 is a view illustrating a method of selecting a related image according to a non-sequential arrangement command.

FIG. 11 is a view illustrating an image selecting method when a non-sequential arrangement menu is selected. When a non-sequential arrangement command is input, the controller 120 may select related images from a plurality of images in a sequence of higher relevance images being selected first. Having higher relevance refers to having the most similar common element. For example, when an object shape is an element item, if a captured image of a soccer ball is a first image, another captured image of the same soccer ball, rather than a captured image of a similar circular thing, such as the sun or a traffic light, may be first selected as a related image to the first image. To determine relevance, the controller 120 may compare objects recognized as a common element in a pixel unit or a unit of a predetermined number of pixel blocks. FIG. 11 illustrates that an eighth image has been selected as an image with the highest relevance with respect to the first image, and third and fifth images have been selected next as the related images. As illustrated in FIG. 11, when the non-sequential arrangement command is input, images may be displayed irrespective of the storage sequence.

As such, the display apparatus 100 may display related images by selecting them in various manners.

In accordance with another exemplary embodiment, the display apparatus 100 may further include a capturing unit in addition to the storage 110, the controller 120, and the display 130. The capturing unit is a component for acquiring an image by executing a capturing operation.

Figure 12:
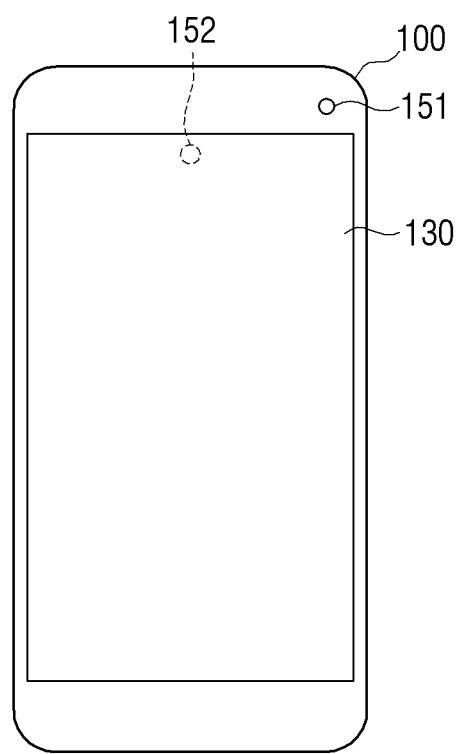
FIG. 12 is a view illustrating a configuration of a display apparatus further including a capturing unit.

FIG. 12 is a view illustrating a display apparatus 100 further including a capturing unit in accordance with an exemplary embodiment. When the display apparatus 100 is implemented as a cellular phone, a tablet PC, a PC, a PDA or the like, the capturing unit may include a first capturing element 151 formed on a first surface where the display 130 is located, and a second capturing element 152 formed on a second surface located opposite to the first surface. In FIG. 12, the second capturing element 152 formed on the second surface is represented in a shape with a dotted line. FIG. 12 illustrates that two capturing elements are provided, but only one capturing element or more than two capturing elements may also be provided.

The first and second capturing elements 151 and 152 may be implemented as a lens and an image sensor. Types of lenses which can be used for the first and second capturing elements 151 and 152 may include a standard lens, a wide-angle lens, a zoom lens and the like. The type of lens may depend on type, characteristic, and usage environment of the display apparatus 100. Examples of the image sensor may include a complementary metal oxide semiconductor (CMOS), a charge coupled device (CCD) and the like.

When a capture icon is selected on a wallpaper, the controller 120 may activate one of the first and second capturing elements 151 and 152. The controller 120 may display a live view on the display 130 using light which is incident through the lens of the activated capturing element. The user may input a capture command by pressing the capture button while viewing the live view. When the capture command is input, the controller 120 may execute a capturing operation by controlling the activated capturing element.

Accordingly, when an image is captured by one of the first and second capturing elements 151 and 152, the controller 120 may detect characteristic information related to the captured image, and store both the detected characteristic information and the image in the storage 110. The characteristic information refers to information which may be used when a related image is selected.

FIGS. 13A and 13B are views illustrating a method of extracting characteristic information. As illustrated in FIG. 13A, it is assumed that a captured image 1300, including a plurality of objects 1310 and 1320, is acquired. Here, referring to FIG. 13B, the controller 120 may divide the captured image 1300 into a plurality of pixel blocks. The controller 120 may calculate an average value of pixel values of pixels which are included in each pixel block, to set to a representative value of the corresponding pixel block. The controller 120 may repeat an operation of sequentially selecting the pixel blocks one by one along a right line from the most left upper corner, and comparing the representative value of the selected pixel block with representative values of neighboring pixel blocks. When the difference between the representative values is more than a preset threshold value according to the comparison, the controller 120 may determine that the corresponding pixel block is a pixel block corresponding to an edge. By executing the operation, the controller 120 may separate the objects 1310 and 1320, included in the entire image 1300, from each other. As illustrated in FIG. 13B, the controller 120 may detect shape, color (red, yellow, blue) and the like of the divided objects 1310 and 1320. The controller 120 may then compare the objects 1310 and 1320 with reference information pre-stored in the storage 110, to search for identification information related to the object 1320. FIG. 13B illustrates that a name of the object 1320 (e.g., a user) is determined to be AAA. When a variety of characteristic information is extracted as illustrated in FIG. 13B, the controller 120 may match the extracted characteristic information with the image 1300 to store in the storage 110. Here, the extracted characteristic information may match the image 1300 itself, or be stored in form of a separate meta file together with an identifier for the image 1300.

FIGS. 13A and 13B exemplarily illustrate the algorithm for extracting objects by dividing the image in a pixel block unit, but various other object extraction algorithms may also be applicable.

Figure 14:
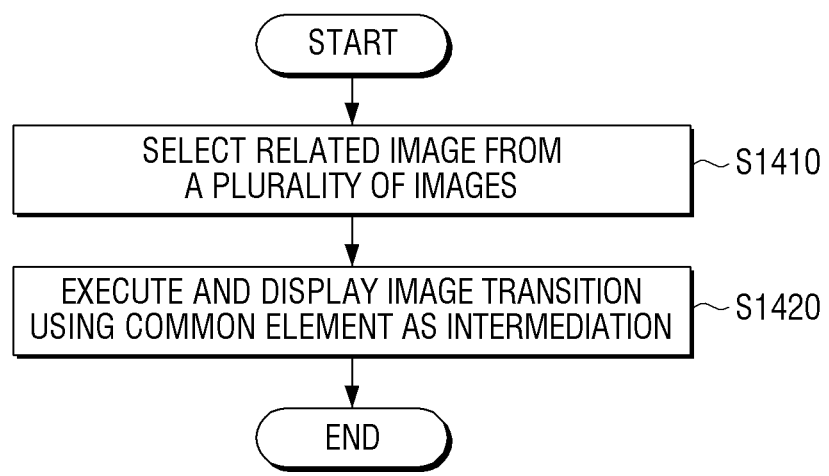
FIG. 14 is a flowchart illustrating an image displaying method in accordance with an exemplary embodiment.

FIG. 14 is a flowchart illustrating an image displaying method in accordance with an exemplary embodiment. As illustrated in FIG. 14, a display apparatus 100 may select a related image which has a common element to an image which has currently been selected from a plurality of images stored (S1410). Elements to be determined as the common element and the determination algorithms have been described in the aforementioned various exemplary embodiments, so repetitive description thereof will be omitted.

When the related images have been selected, the display apparatus 100 may sequentially display the plurality of related images and execute image transition between a previous image and the selected related image. The image transition may be carried out through intermediation of the common element (S1420). Various examples of the image transition have been aforementioned in detail, so repetitive description thereof will be omitted.

The selecting of the related image may be executed when a slide show display command is input. For example, when the slide show display command is input, one image may first be selected from a plurality of images which have been previously stored. One succeeding image, which has a common element to an element included in the selected image, may then be selected as a related image with respect to the selected image. The display apparatus 100 may execute transition between the previous image and the selected image. Afterwards, the display apparatus 100 may execute the image transition again by selecting the next related image.

Characteristic information for selecting a related image may be extracted in real time by analyzing the next image during the related image selecting process. However, to reduce the burden of calculation, characteristic information may be extracted for each image in advance and stored.

Specifically, when the display apparatus 100 includes a capturing element, the method may further include acquiring a captured image by executing a capturing operation, detecting characteristic information related to the captured image, and storing the characteristic information together with the captured image.

Also, the method may further include generating a transition screen using a transition platform corresponding to the common element between the related images among a plurality of transition platforms pre-stored in the display apparatus 100. The generated transition screen may be displayed between display sections of the images.

The slide show may be executed in various manners according to a user's menu selection.

Figure 15:
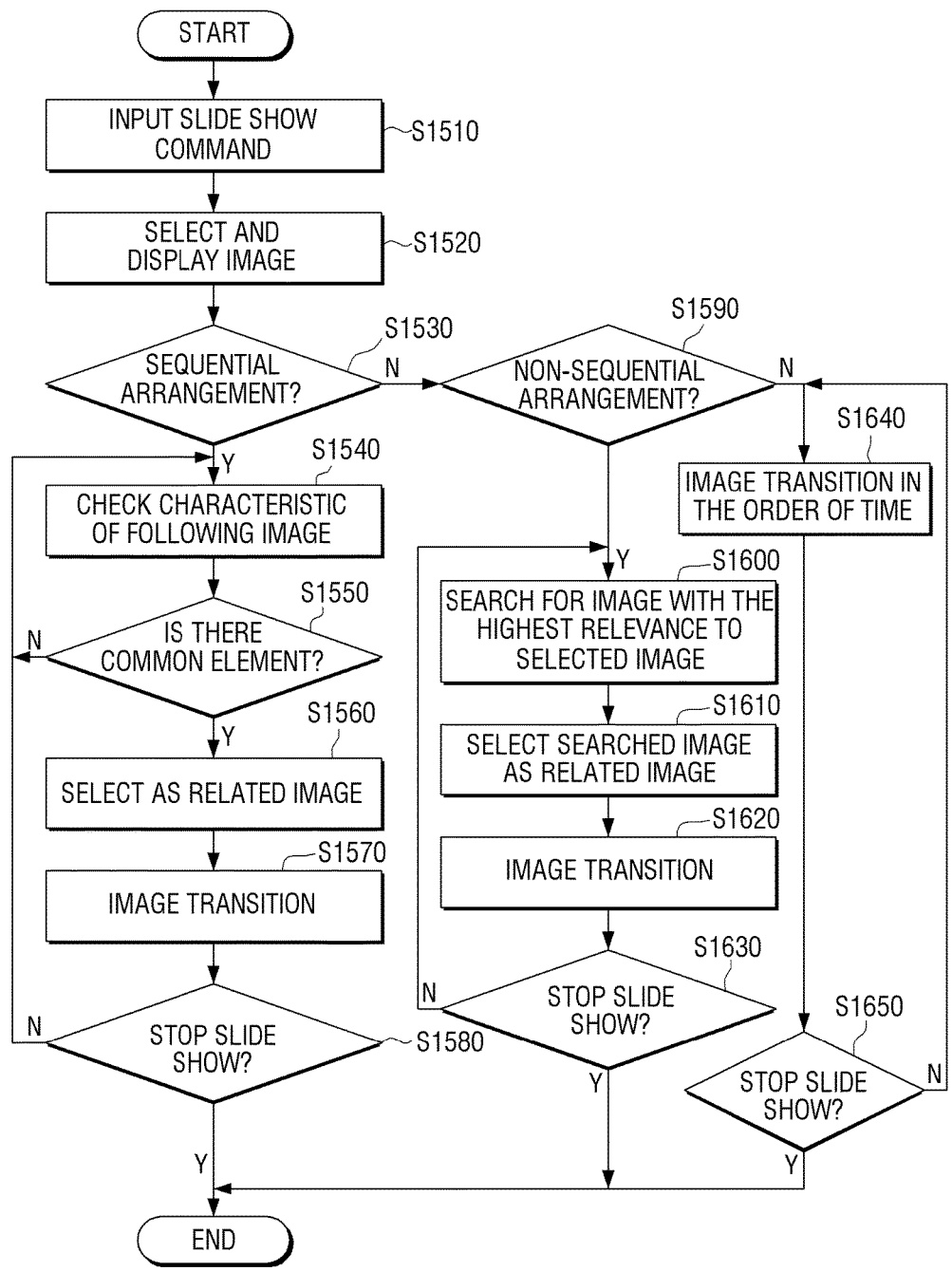
FIG. 15 is a flowchart illustrating an image displaying method of processing an image differently according to a menu selection.

Referring to FIG. 15, when the user inputs a slide show command (S1510), one image may be selected from the stored images to be displayed (S1520).

In this state, when the user selects a sequential arrangement menu (S1530), a characteristic of the succeeding (following) image may be checked according to a storage sequence (S1540). Whether or not the succeeding image includes a common element to the previous image may be determined by comparison with the checked characteristic (S1550). When it is determined to have the common element, the succeeding image may be selected as a related image (S1560). The previous image may transit into the selected related image (S1570).

Until an event to stop the slide show is generated (S1580), the display apparatus 100 may repetitively execute the operation of checking the succeeding image in a sequential manner to select the related image. Here, the event may include a search completion up to the last image, input of a user command for stopping the slide show, and the like.

When the user selects a non-sequential arrangement menu (S1590), an image, which has the highest relevance to the currently selected image among the other images, may be searched for (S1600).

When the image has been searched for, the display apparatus 100 may select the searched image as a related image (S1610), and the image transition into the selected image may be carried out (S1620). Even when the non-sequential arrangement menu is selected, the operation of selecting and displaying the related image may be repetitively executed until the event to stop the slide show is generated (S1630).

When a command for executing the slide show in a time sequence, other than the sequential or non-sequential arrangement, is input, an image transition may be carried out in a time sequence (S1640). This operation may also be repeated until the event to stop the slide show is generated (S1650).

The type of common element, the related image determination algorithm, the image transition algorithm and the like have already been described in the aforementioned exemplary embodiments, so repetitive description thereof will be omitted.

The aforementioned exemplary embodiments have illustrated that the display apparatus 100 includes the storage 110, the controller 120, the display 130, the capturing elements 151 and 152 and the like. However, the display apparatus 100 may also further include various additional functions such as a communication function or a multimedia playback function.

Figure 16:
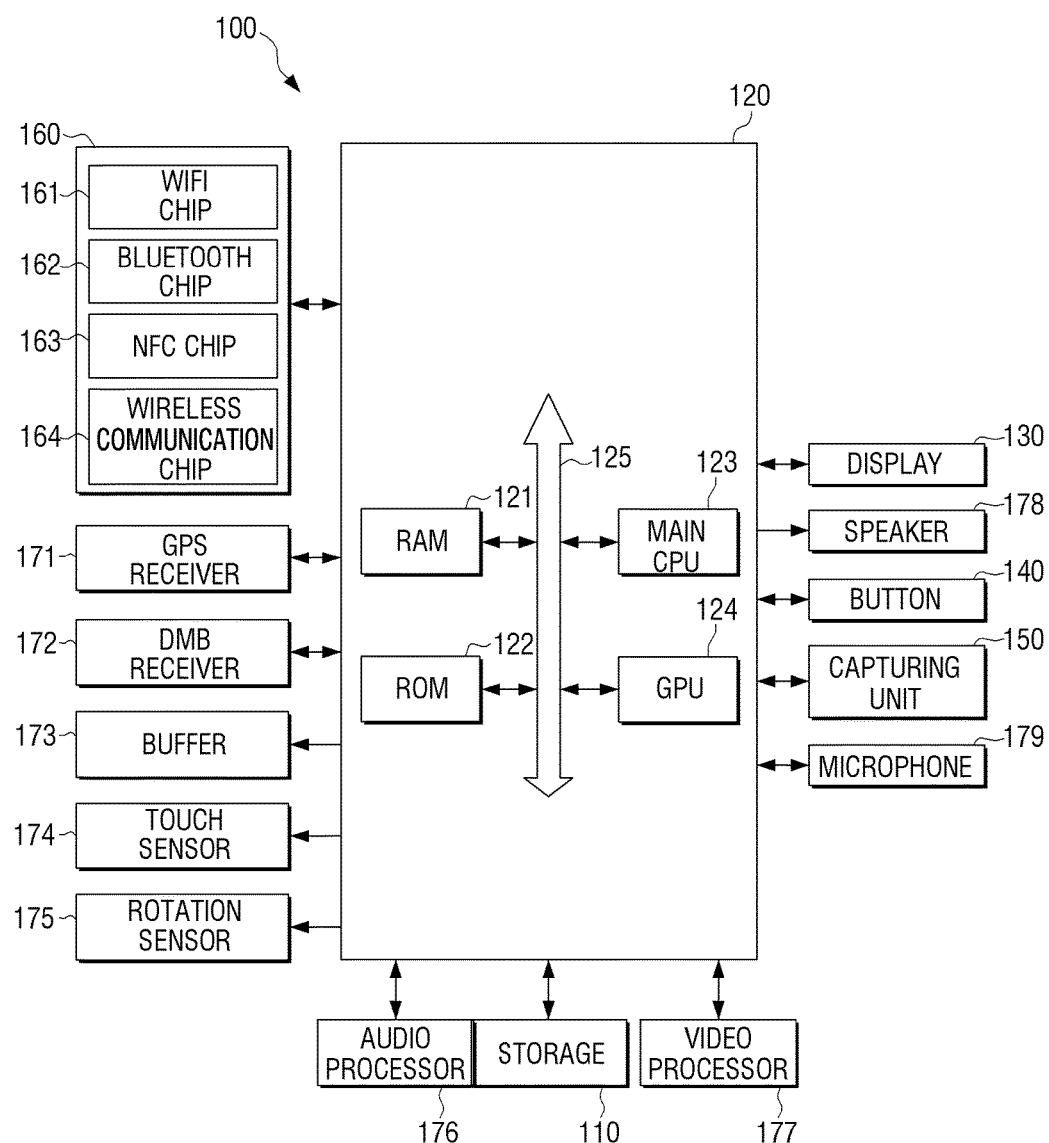
FIG. 16 is a block diagram illustrating a configuration of a display apparatus in accordance with various exemplary embodiments.

FIG. 16 is a block diagram illustrating an overall configuration of a display apparatus 100 in accordance with various exemplary embodiments.

As illustrated in FIG. 16, a display apparatus 100 may include a button 140, a capturing unit 150, a communication unit 160, a global positioning system (GPS) receiver 171, a digital multimedia broadcasting (DMB) receiver 172, a buffer 173, a touch sensor 174, a rotation sensor 175, an audio processor 176, a video processor 177, a speaker 178, and a microphone 179, as well as the storage 110, the controller 120, the display 130.

The storage 110 may store various programs, such as O/S or firmware for operating the display apparatus 100, and other applications, as well as image data and characteristic information.

The controller 120 may control an operation of the display apparatus 100 using the programs stored in the storage 110. In detail, the controller 120 may execute the slide show function of executing the sequential image transition by selecting the related images, as aforementioned.

The display 130 may display various screens according to the control of the controller 120.

The button 140 may indicate the home button 141 and the hidden buttons 142 and 143, as described above. In addition to those buttons, various buttons, such as a power button or a volume adjusting button disposed on a side of the display apparatus 100, may be included.

The capturing unit 150 may include the first and second capturing elements 151 and 152, as aforementioned. The communication unit 160 may execute communication with various types of external devices according to various types of communication methods. The communication unit 160 may include a WiFi chip 161, a Bluetooth chip 162, an NFC chip 163, and a wireless communication chip 164. The WiFi chip 161, the Bluetooth chip 162, and the NFC chip 163 may execute communications according to a WiFi communication method, a Bluetooth communication method, and an NFC communication method, respectively. The wireless communication chip 164 refers to a chip which executes communication according to various communication standards, such as IEEE, ZigBee, third generation (3G), third generation partnership project (3GPP), long term evolution (LTE) and the like. The communication unit 160 may include at least one of the various chips or chips according to other communication standards, and execute communications with external servers or other devices using the chips.

The GPS receiver 171 may be a component which receives a GPS signal from a GPS satellite to calculate a current location of the display apparatus 100.

The DMB receiver 172 may be a component which receives and processes a DMB signal.

The buffer 173 may store screen data to be displayed on the display 130.

The touch sensor 174 may be a component which senses a touch input on a surface of the display 130. The touch sensor 174 may be implemented as various types of sensors, such as a capacitive sensor, a resistive sensor and the like. The capacitive sensor is a sensor which uses a dielectric coated on a surface of the display 130 to calculate a coordinate value of a touch by sensing fine electricity, which is excited to a user's body when a part of the user's body touches the surface of the display 130. The resistive sensor is a sensor which calculates a coordinate value of a touch by sensing a current, which flows in response to upper and lower plates, mounted in the display 130, coming in contact with each other on a touched point when a user touches a screen. As such, the touch sensor 174 may be implemented into various forms. The coordinate value of the touch sensed by the touch sensor 174 may be provided to the controller 120. The controller 120 may determine which object has been selected by comparing a coordinate value of each object within a displayed screen with a touch coordinate value calculated by the touch sensor 174. For example, when a particular point on a screen is touched, the controller 120 may display various menus on one side of the screen. When a gallery program is being executed, the displayed menus may include a slide show menu and the like. When the user touches a point where the slide show menu is displayed, the controller 120 may execute image transition by selecting related images, as aforementioned.

The rotation sensor 175 may sense a rotated state of the display apparatus 100 using an electromagnetic sensor, a gyro sensor, an acceleration sensor and the like. When the rotation is sensed, the controller 120 may change a display orientation of the screen of the display 130 according to the rotated state.

The audio processor 176 may be a component which processes audio data included in contents. The audio processor 176 may execute various types of processing, such as decoding, amplifying, noise filtering and the like with respect to the audio data.

The video processor 177 may be a component which processes video data included in contents. The video processor 177 may execute various image processing, such as decoding of video data, scaling, noise filtering, frame rate conversion, resolution change and the like.

The audio processor 176 and the video processor 177 may be driven when a program for reproducing contents received from an external source or contents stored in the storage 110 is executed.

The display 130 may display image frames generated in the video processor 177. Also, the speaker 178 may output audio data generated in the audio processor 176.

The microphone 179 may receive user voice or other sound and convert it into audio data. The controller 120 may use the user voice input through the microphone 179 during a call or convert the user voice into the audio data to store in the storage 110. For example, the controller 120 may activate the microphone 179 when a video capturing is executed.

The controller 120 may boot the display apparatus 100 using various programs and data stored in the storage 110, and execute the image displaying method according to the aforementioned various exemplary embodiments.

The controller 120 may include a RAM 121, a ROM 122, a main CPU 123, a graphic processing unit (GPU) 124, a bus 125 and the like.

The RAM 121, the ROM 122, the main CPU 123, the GPU 124 and the like may be interconnected via the bus 125. In addition, various interfaces may further be included, but illustration and description thereof will be omitted.

The main CPU 123 may execute a booting operation using O/S stored in the storage 110 by accessing the storage 110. The ROM 122 may store command word sets for system booting. When power is supplied in response to an input of a turn-on command, the main CPU 123 may copy the O/S stored in the storage 110 into the RAM 121 according to a command word stored in the ROM 122, execute the O/S and boot the system. Upon completion of the booting, the main CPU 123 may copy various application programs stored in the storage 110 into the RAM 121, execute the copied application program, and execute various operations.

The GPU 124 may generate a wallpaper, an icon display screen and other transition screens according to the control of the main CPU 123. The GPU 124 may calculate attribute values, such as a coordinate value, a shape, a size, a color and the like of each object within a transition screen based on a transition platform stored in the storage 110. The GPU 124 may generate the various transition screens, as aforementioned, based on the calculated attribute values. The generate screen data may be stored in the buffer 173. The screen data stored in the buffer 173 may be displayed on the display 130.

The main CPU 123 may sequentially store in the buffer 173 an image selected as a related image from images stored in the storage 110, and the transition screen generated in the GPU 124, such that the display 130 can execute a continuous image transition.

FIG. 16 illustrates various components which may be mounted when the display apparatus 100 is implemented as a terminal device which overall supports various functions, such as communication, automatic rotation, DMB, GPS and the like. Therefore, depending on exemplary embodiments, some of those components illustrated in FIG. 16 may be omitted or varied, or other components may further be added.

In accordance with the various exemplary embodiments, a common element between photos may be checked and a smooth slide show may be executed through intermediation of the common element. This may provide a movie-like scene transition effect. Also, the common element may be set by each user, which may allow for production of contents in form of "Personal Movie."

The image displaying method according to the foregoing exemplary embodiments may be coded into software to be stored in a non-transitory readable medium. The non-transitory readable medium may be connected or mounted to various types of display apparatuses or capturing devices so as to support the corresponding devices to execute the aforementioned method.

The non-transitory computer readable medium is a medium, which stores data semi-permanently and is readable by a device. Specifically, various applications and programs described above may be provided by being stored in the non-transitory computer readable medium such as a CD, a DVD, a hard disk, a Blu-ray disk, an USB, a memory card, a ROM, etc.

While certain exemplary embodiments have been particularly illustrated and described, it will be understood by those of ordinary skill in the art that various modifications, additions, and substitutions are possible, without departing from spirit and scope of the inventive concept as defined by the appended claims. The exemplary embodiments should be considered in the descriptive sense only and not for purposes of limitation.

What is claimed is:

1. A display apparatus comprising:
a display;
a storage configured to store a plurality of images; and
a controller configured to, in response to receiving a user input for selecting an image and a user input for selecting an element item through a select screen displayed on the display, select a plurality of related images having an element item with a same attribute as the selected element item included in the selected image, and to control the display to sequentially display the plurality of related images while executing an image transition between each of the sequentially displayed related images through intermediation of the element item of the plurality of related images,
wherein the element item comprises at least one element item of a color of an object included in the image and an object display position.

2. The apparatus of claim 1, wherein the controller is further configured to control the display to display one image by selecting the one image from the plurality of images in response to a slide show display command being input, and control the display to display each selected related image in a sequential manner by repetitively performing an operation of selecting one succeeding image from the plurality of images as the related image for the selected one image, the one succeeding image having an element item with the same attribute as the element item included in the selected one image.

3. The apparatus of claim 1, further comprising an image sensor configured to capture an image,
wherein the controller is further configured to detect characteristic information related to the captured image in response to the image sensor capturing the image, store the detected characteristic information and the captured image in the storage, and select the captured image as a related image of the plurality of related images by comparison of the characteristic information.

4. The apparatus of claim 1, wherein the storage is further configured to store a plurality of transition platforms, and
wherein the controller is further configured to generate a transition screen, corresponding to the image transition between each of the sequentially displayed related images, by using a transition platform, corresponding to the element item of the related images, of the plurality of transition platforms.

5. The apparatus of claim 1, wherein the element item is divided into a plurality of element items having preset priorities, and
wherein the controller is further configured to select the related images by sequentially comparing the plurality of element items according to the priorities.

6. The apparatus of claim 1, wherein the controller is further configured to sequentially select the related images having the element item by comparing the plurality of images in a time sequence in response to a sequential arrangement command being input.

7. The apparatus of claim 1, wherein the controller is further configured to select the related images from the plurality of images in a sequence of decreasing relevance beginning with the related image having a most similar element item of the related images, in response to a non-sequential arrangement command being input.

8. The apparatus of claim 1, wherein the controller is further configured to select the related images by comparing the element items selected through the select screen.

9. An image displaying method for a display apparatus, the method comprising:
selecting, in response to receiving a user input for selecting an image and a user input for selecting an element item through a select screen, a plurality of related images having an element item with a same attribute as the selected element item included in the selected image; and sequentially displaying on a display of the display apparatus the plurality of related images while executing an image transition between each of the sequentially displayed related images through intermediation of the element item of the plurality of related images, wherein the element item comprises at least one element item of a color of an object included in the image and an object display position.

10. The method of claim 9, wherein the selecting the plurality of related images comprises:

selecting one image from the plurality of images in response to a slide show display command being input; and selecting at least one related image by repetitively executing an operation of selecting one succeeding image from the plurality of images as a related image for the selected image, the one succeeding image having an element item with the same attribute as the element item included in the selected image, wherein the sequentially displaying the plurality of related images is executed to sequentially display the at least one related image after displaying the selected image.

11. The method of claim 9, further comprising:

acquiring a captured image by executing a capturing operation;

detecting characteristic information related to the captured image; and matching the detected characteristic information with the captured image for storage.

12. The method of claim 9, further comprising:

generating a transition screen, corresponding to the image transition between each of the sequentially displayed related images, by using a transition platform, corresponding to the element item of the related images, of a plurality of stored transition platforms.

13. The method of claim 9, wherein the element item is divided into a plurality of element items having preset priorities, and wherein the selecting the plurality of related images comprises selecting the related images by sequentially comparing the plurality of element items according to the priorities.

14. The method of claim 9, wherein the selecting the plurality of related images comprises sequentially selecting the related images having the element item by comparing the plurality of images in a time sequence in response to a sequential arrangement command being input.

15. The method of claim 9, wherein the selecting the plurality of related images comprises selecting the related images from the plurality of images in a sequence of decreasing relevance beginning with the related image having a most similar element item of the related images, in response to a non-sequential arrangement command being input.

16. The method of claim 9, wherein the selecting the plurality of related images is executed to select the related image by comparing the element items selected through the select screen.

17. A display apparatus comprising:

a display;

a storage configured to store a plurality of images; and a controller configured to, in response to receiving a user input for selecting an image and a user input for selecting an element item through a select screen displayed on the display, select related images having an element item with a same attribute as the selected element item included in the selected image, and to control the display to sequentially display the related images while executing an image transition between each of the sequentially displayed related images through intermediation of the element item of the related images, wherein the element item comprises at least one element item of a color of an object included in the image and an object display position.

18. The display apparatus of claim 17, wherein the executing the image transition comprises controlling the display to display at least one transition image between each of the sequentially displayed related images.

19. The display apparatus of claim 18, wherein the controller is further configured to generate each of the at least one transition image based on the element item of adjacent related images of the sequentially displayed related images and a stored transition platform corresponding to the element item of the adjacent related images.

20. The display apparatus of claim 17, wherein the element item is selected from at least one element included in a first image from the plurality of images, wherein the first image is selected in response to a first input by a user, and wherein the select screen includes the selected first image.

21. The display apparatus of claim 20, wherein the element item is automatically selected from the at least one element included in the first image based on preset priorities.

22. The display apparatus of claim 20, wherein the element item is selected from the at least one element included in the first image in response to a second input by the user.

23. The display apparatus of claim 20, wherein the related images are arranged to be sequentially displayed based on a relevance of the element item of each of the related images to the element item of the first image.

24. The display apparatus of claim 17, wherein the related images are arranged to be sequentially displayed based on an order that the related images are stored in.

* * * * *